(12) United States Patent
Resnick

(10) Patent No.: US 7,292,950 B1
(45) Date of Patent: Nov. 6, 2007

(54) MULTIPLE ERROR MANAGEMENT MODE MEMORY MODULE

(75) Inventor: David R. Resnick, Eau Claire, WI (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 11/382,178

(22) Filed: May 8, 2006

(51) Int. Cl.
*G06F 11/10* (2006.01)
*G06F 11/00* (2006.01)

(52) U.S. Cl. ............... 702/85; 700/1; 700/11; 700/21; 702/127; 714/2; 714/5; 714/100

(58) Field of Classification Search ............ 700/1, 700/11, 21; 702/57, 58, 85, 127; 714/1, 714/2, 3, 5, 6, 7, 8, 100
See application file for complete search history.

(56) References Cited

U.S. PATENT DOCUMENTS

| | | | | |
|---|---|---|---|---|
| 3,245,049 A * | 4/1966 | Sakalay | ............ | 714/6 |
| 3,348,197 A * | 10/1967 | Coddington et al. | ............ | 714/3 |
| 3,350,690 A * | 10/1967 | Rice | ............ | 714/5 |
| 3,434,116 A * | 3/1969 | Anacker | ............ | 714/7 |
| 3,501,748 A * | 3/1970 | Duda et al. | ............ | 714/7 |
| 3,898,443 A * | 8/1975 | Smith | ............ | 714/711 |
| 4,394,763 A * | 7/1983 | Nagano et al. | ............ | 714/6 |
| 4,456,993 A * | 6/1984 | Taniguchi et al. | ............ | 714/6 |
| 4,961,193 A * | 10/1990 | Debord et al. | ............ | 714/753 |
| 5,734,664 A * | 3/1998 | Saxena | ............ | 714/766 |
| 6,425,108 B1 * | 7/2002 | Chiang | ............ | 714/764 |
| 6,804,794 B1 * | 10/2004 | Robidoux et al. | ............ | 714/5 |
| 7,069,473 B2 * | 6/2006 | Yasuda | ............ | 714/37 |
| 2003/0070114 A1 * | 4/2003 | Yasuda | ............ | 714/20 |
| 2006/0174182 A1 * | 8/2006 | Neefs et al. | ............ | 714/785 |
| 2007/0079184 A1 * | 4/2007 | Weiss et al. | ............ | 714/718 |

FOREIGN PATENT DOCUMENTS

JP          08-203292 A  *  8/1996

* cited by examiner

*Primary Examiner*—Edward R Cosimano
(74) *Attorney, Agent, or Firm*—Schwegman, Lundberg & Woessner, P.A.

(57) ABSTRACT

A memory module comprises a plurality of storage bits for each memory location, and a plurality of error management storage bits for each memory location. A memory controller is operable to change error management modes on the memory module. Changing error management modes comprises in one example using an error management mode providing the greatest error management capability for the number of operable memory components available within the memory module.

32 Claims, 2 Drawing Sheets

MULTIPLE ERROR MANAGEMENT MODE MEMORY MODULE

FIELD OF THE INVENTION

The invention relates generally to computer system memory, and more specifically to a memory module that is operable in multiple error correction and detection modes.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

A wide variety of computerized systems, from the smallest personal digital assistants to the most powerful supercomputers, use memory to store programs for fast execution, and to store data for rapid access while the computer system is operating. Volatile memory, such as the dynamic random access memory (DRAM) most commonly found in personal computers, is able to store data such that it can be read or written much more quickly than the same data could be accessed using nonvolatile storage such as a hard disk drive or flash nonvolatile memory. Volatile memory loses its content when power is cut off, so while it is generally not useful for long-term storage it is generally used for temporary storage of data while a computer is running.

A typical random-access memory consists of an array of transistors or switches coupled to capacitors, where the transistors are used to switch a capacitor into or out of a circuit for reading or writing a value stored in the capacitive element. These storage bits are typically arranged in an array of rows and columns, and are accessed by specifying a memory address that contains or is decoded to find the row and column of the memory bit to be accessed.

The memory in a computer usually takes the form of a network of such circuit elements formed on an integrated circuit, or chip. Several integrated circuits are typically mounted to a single small printed circuit board to form a memory module, such as single inline memory modules (SIMMs) having a 32-bit memory channel for reading and writing data, or dual inline memory modules (DIMMs) having a 64-bit memory channel. Some more sophisticated types of memory modules include synchronous dynamic random access memory, or SDRAM, which runs in synchronization with the computer's bus, and double data rate (DDR) SDRAM or DDR2 SDRAM, which transfer data on both the rising and falling edges of the clock and have memory channel widths up to 64 bits of data and 8 bits of error management information per memory transfer.

Improvements in memory technology over time include making memory chips smaller, faster, and operable to consume less power and therefore to generate less heat. But, the constant push to improve memory performance and the imperfect nature of manufactured goods in general suggest that occasional flaws or imperfections will occur. Individual memory bit storage locations occasionally go bad, and sometimes even whole memory chips fail. It is also known that various electrical phenomena can regularly cause memory read or write errors, such as electromagnetic noise causing a signal level to change or a cosmic ray changing the state of one or more bits of memory. Reductions in the size of memory elements and reductions in the voltage used to operate the memory make such problems increasingly important to consider when designing memory, Error management is therefore implemented in many memory systems, and is most typically embodied in a single parity bit per data byte that is operable to indicate when a single bit has changed state, or error correction codes (ECC) that can detect and often correct single-bit errors in memory systems. Even though the reliability of individual memory components is very high, the number of memory components in large computer systems and the cost involved with producing the amount of memory needed make memory error detection and correction an important consideration in memory system design.

SUMMARY

In one example embodiment of the invention, a memory module comprises a plurality of storage bits for each memory location, and a plurality of error management storage bits for each memory location. A memory controller is operable to change error management modes on the memory module. Changing error management modes comprises in one example using an error management mode providing the greatest error management capability for the number of operable memory components available within the memory module, such as changing from single chip error correction/double chip error detection (SCEC) to single bit error correction/double bit error detection (SECDED) when a memory part fails.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Various embodiments of the invention seek to provide improved error correction management in memory systems.

One such embodiment comprises a memory module having a plurality of storage bits for each memory location, and a plurality of error management storage bits for each memory location. A memory controller is operable to change error management modes on the memory module. Changing error management modes comprises in one further example using an error management mode providing the greatest error management capability for the number of operable memory components available within the memory module, such as changing from single chip error correction/double chip error detection (SCEC) to single bit error correction/double bit error detection (SECDED) if a memory part fails, or using an error management or spare chip as a replacement part should a memory part fail in system operation.

Figure 1:
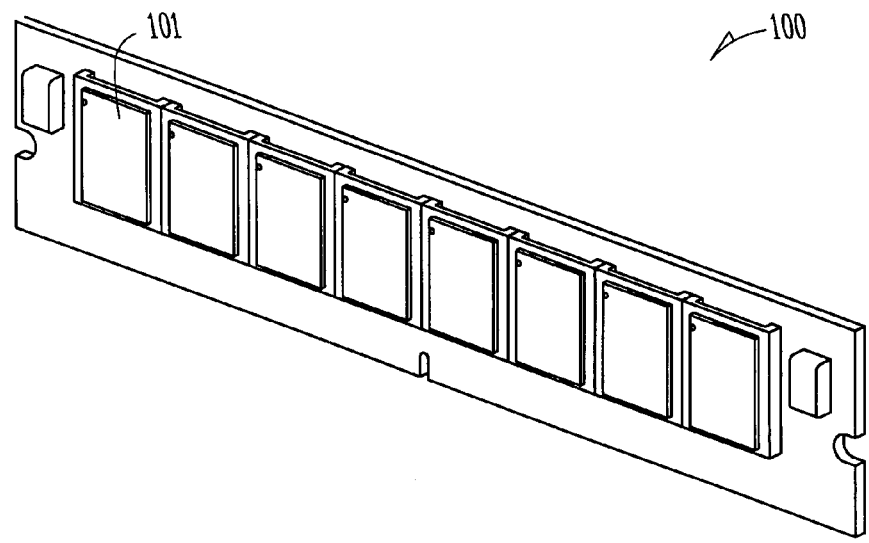
FIG. 1 shows a memory module having data storage memory parts, error management memory parts, and a memory controller mounted to a circuit board, consistent with some example embodiments of the invention.
Figure 1:
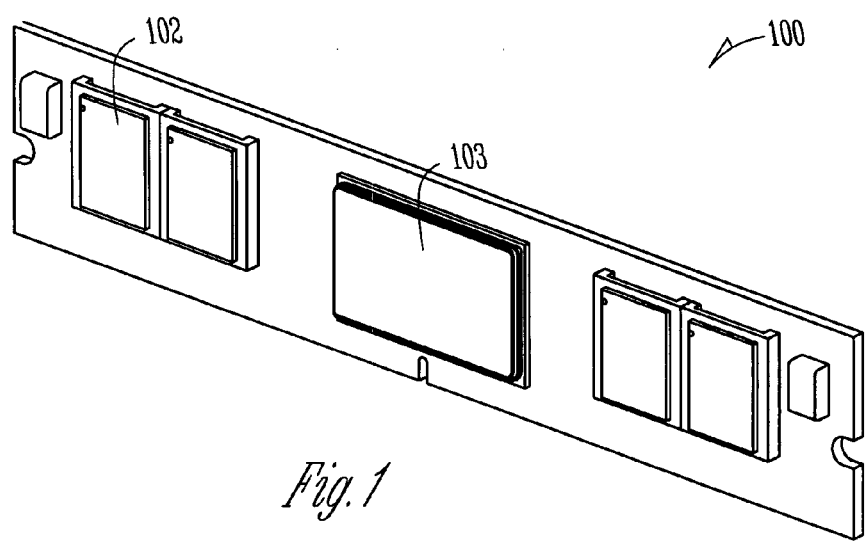

FIG. 1 illustrates a memory module 100, including eight memory chips 101 used for storing data, four memory chips 102 used for storing error management information, and a memory controller 103. In other examples, different numbers of memory chips 102 are available for storing error management information, such as three memory chips. The memory chips and controller are mounted to a printed circuit board as shown at 100, and in further embodiments are mounted on risers as shown in FIG. 1 such that each location can support two chips. This doubles the number of memory devices on a memory module 100 and provides two memory channels on the same memory module, such that interleaving two memory subsections through a dual memory channel configuration provides faster data transfer than a single subsection module by interleaving data requests and transfers from the dual memory channels.

Each memory device 101 in this example is capable of storing 8 bits of information at a given address, such that 64 bits of information are provided for each address when data is retrieved from all eight memory chips. Similarly, each of the three or four error correction memory chips 102 is able to store 8 bits, such that 24 bits (using three ECC parts) or 32 bits (using four ECC parts) of error management data can be stored for each address on the memory module. The memory controller 103 is able to use the error management data to detect, and in some cases correct, memory errors in the eight data memory chips 101. In a still further example, one of the error management chips 102 can be substituted for a failed data memory chip 101, enabling continued operation in the presence of a full data chip failure. It takes 3 ECC parts to support SCEC in the most efficient implementations for ECC algorithms like Reed-Solomon. A $4^{th}$ part ECC part can be included to function as an operable spare memory part so that SCEC operation can continue in the presence of a memory chip failure.

Detection of a single data bit error for a memory address can sometimes be performed using only a single bit of information for each data word stored in memory. In one example, the parity bit stored in the error management chip 102 for each of the eight data memory chips 101 indicates whether the sum of bits in each of the chips is even or odd, enabling detection of a single bit error, as well as multi-bit errors in which an odd number of bits are changed. Parity error management data does not contain enough information to determine which bit is bad, so error correction is not possible with parity error management methods.

More sophisticated memory error management methods include basic single bit error correction (SEC); single error correction, double error detection (SECDED); and SCEC, which stands for single chip error correction 1 and includes double chip error detection capability. SEC and SECDED typically use what is known as a Hamming code, or modifications of a Hamming code, to produce error management data that can be compared against the data read from memory to detect and correct errors. Codes produced from the data words stored in data memory 101 are stored in the error management devices 102. The error management code space needed for a particular error detection or correction algorithm depends on the number of bits of data stored in a memory location, and is not necessarily directly proportional to the size of the individually addressable word stored in memory.

For example, SECDED requires a number of error management bits such that each doubling of the number of bits in an addressable memory location results in a single bit increase in the number of error management bits needed. For example, a memory having eight 4-bit data storage chips for 32 bits per addressable memory location requires seven bits of error management data or checkbits to implement SECDED, while a memory having eight 8-bit data storage chips for 64 bits per addressable memory location requires eight bits of error management data to implement SECDED. In the first example using 4-bit data storage parts, two error management parts would be required to store the 7 bits of error management data needed, while in the second example using 8-bit data storage parts, the 8 bits of error management data required can be stored in a single 8-bit error management data part. This makes SECDED relatively efficient for systems employing large addressable memory locations, such as the 64-bit data word in this example.

SECDED also provides the ability not only to correct a single bit error, but to detect most multi-bit errors of three or more bits and to distinguish them from single bit errors. Two-bit errors can always be detected, but not repaired, and multi-bit errors of three or more bits can't be corrected, but they can generally be detected and a memory error signal can be generated so that corrupted data is not used under the mistaken belief that it is valid data. For failures of an even number of bits greater than two bits, SECDED will sometimes misidentify the error and allow corrupted data to be used as valid, but such instances are rare relative to single-bit or double-bit error rates. In large memory systems or where very high system reliability is a priority, additional error correction methods can handle these relatively rare errors.

Single Chip Error Correction, or SCEC, improves upon the ability of SECDED in that it can handle the failure of an entire memory part or chip, such as losing one of the eight 8-bit data storage chips 101 of FIG. 1. SCEC in one embodiment uses an error code known as a Reed-Solomon code to enable recovery of the data lost in the failure of an entire chip, but takes three parts or memory chips to correct data from eight data chips using 8-bit chips.

In some further embodiments, SCEC or SECDED-configured memory modules contain an extra or spare chip, which can be substituted for a failed chip should a chip failure occur. For example, consider the memory module of FIG. 1 populated with eight 8-bit data chips and four 8-bit error management chips, and implementing SCEC. When a data chip fails, the three error management chips can be used to implement SCEC, and can rebuild the data from the failed memory part on the spare, fourth error management chip. The fourth error management chip therefore serves as a spare, and can enable full SCEC protection to continue, even after the failure of a single chip.

The memory module of FIG. 1 can therefore be configured to use anywhere from a single error management data chip 102 for functions such as SECDED, to four error management chips to implement SCEC across three chips with a spare to replace a failed chip. In the example having four error management chips, the fourth error management chip is not used to store SCEC error management data but is simply available as a spare so that SCEC operation can continue in the event of a memory chip failure.

Some embodiments of the invention provide the ability, such as via the memory module controller 103, to switch between modes on a given memory module. For example, a memory module may be supplied configured to perform SCEC, but may be operated in SECDED mode by choice. In another example, a memory module such as that of the previous example having three error management parts and running SCEC can change modes to SECDED upon failure of a memory chip, optionally using one of the error management parts previously used to store SCEC data to substitute for the failed chip if the failed chip is a data memory chip 101 rather than an error management chip 102. The remaining two error management parts then continue to provide error management in SECDED mode.

Figure 2:
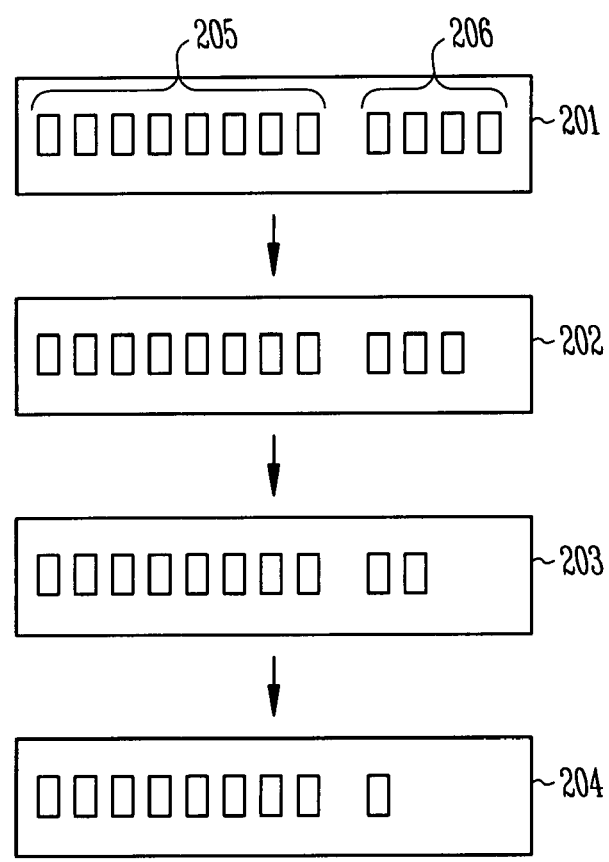
FIG. 2 is a block diagram showing various memory configurations as memory parts on a memory module are excluded from the memory module or fail, consistent with some example embodiments of the invention.

FIG. 2 is a diagram showing a variety of examples of error management mode configurations available in a memory module having various numbers of functional memory chip parts. The memory module 201 has eight data storage chips 205, and has four error management chips 206 installed on the memory module and functional. As chips fail, reducing the number of chips available as shown at 202, 203, and 204, the memory module is operable to change error management modes while in operation via the memory controller as shown at 103 in FIG. 1. Changing error management modes comprises substituting chips for failed chips, changing the way in which error correction data is calculated, and other such changes in various embodiments.

The memory module 201 includes eight 8-bit data storage devices, for a 64-bit data word stored in each addressable memory location. The four error management chips enable full operation of SCEC, which uses three of the chips, plus includes a fourth chip usable as a spare should any of the data storage or error management chips fail. Upon failure of a data chip, the failed data chip is logically removed from the normal data path and the spare chip is substituted in its place, and the data from the failed data chip is rebuilt into the spare chip using the SCEC information stored in the other three error management chips. Full SCEC operation is therefore able to continue after a single data chip failure, but without a spare chip should a further memory chip fail. Similarly, should an error management chip 206 fail on the memory module of 201, SCEC error management data can be rebuilt across the three remaining error management chips, and normal SCEC operation continues without a spare chip, as is shown at 202.

When a data chip in 202 fails, the SCEC algorithm can compensate for the failed chip and rebuild the lost data, but no spare chip is available so error correction will be calculated on the fly rather than being used to rebuild the failed chip's data on a spare chip. The module can optionally sacrifice an error management chip to replace a failed chip, resulting in only two error management devices being available, but because the chip to be used as a spare already contains SCEC data, the data from the lost chip may not be easily recoverable, or may be recovered using a mode change algorithm such as is described below.

In one such example where one of the error management parts is to be used as a data storage part, the memory controller calculates the failed memory part data one address location at a time, and inserts the recovered data for a particular address in the memory part to be used as a spare. The controller also changes the error management data stored in the other remaining error management parts for the same address from SCEC data to SECDED data. Because only a single address is processed at a time, no additional memory chip is needed to store data or error management information. An index counter indicates which addresses have been changed in mode from SCEC to SECDED, and is used by the memory controller to determine which addresses are to be read or written in SCEC or SECDED mode during the mode change process.

In embodiments without such an indexed mode change algorithm, SCEC can continue recovering data for the failed memory part, but another bit error cannot be managed and repaired. In such a case data is lost, and a reboot is necessary so that operation after the reboot can continue in SECDED mode using eight chips functioning as data chips and one chip used to store SECDED error management data, with the second error management chip available as a spare as shown at 203.

Similarly, if an error management chip in 202 fails, SCEC functionality is lost, but the data in memory can be used to build SECDED error management data in one of the two remaining error management chips, with the other error management chip used as a spare.

Loss of a data storage chip in the memory module of 203 therefore may or may not result in loss of the data stored in memory depending on the memory system functionality, but the memory module can use one of the two error management chips as a spare to replace the failed part, enabling continued operation in SECDED mode but without a spare chip available. Further data chip loss results in loss of data, with the possibility of using the sole remaining error management chip as a data chip to enable continued operation with no error correction or detection functionality available.

If an error management chip in memory module 203 fails, the chip is simply marked as unusable whether it was previously used to store SECDED data or being used as a spare. The SECDED error management checkbit data is rebuilt from the data memory, so there is no loss of data. There is some concern that a spare memory part may not be as reliable as the other memory parts, as spare parts generally do not have their data storage capability verified or tested as is often done with active memory parts. One further embodiment therefore includes periodic testing of spare memory parts, such as upon booting a computer system having spare memory parts installed. Also, if memory module 203 is running in SECDED mode when a new error occurs, operation cannot continue if the new error is a multi-bit error.

The particular example of FIG. 2 deals only with 8-bit data and error management parts arranged in an 8-chip data channel, but similar methods can be employed with other numbers of data chips, error management chips, or other numbers of bits per addressable data location on a chip. For example, FIG. 1 shows a memory module having two sets of eight memory chips and two sets of four error management chips, enabling two 64-bit memory channels to operate on a single memory module. In an alternate embodiment, 4-bit, 16-bit, or other bit-width data parts are used, and the number of error management bits needed to implement various error management algorithms such as SCEC or SECDED changes.

In a more complex embodiment such as the dual channel memory module of FIG. 1, spare chips from one channel can be assigned to another channel on the same module if needed, such as to provide continued SECDED operation when a third error management chip would otherwise be unavailable in a single channel. This arrangement will also reduce manufacturing costs in some embodiments, as a single spare error management chip per module will likely provide error management robustness similar to having a spare error management module for each of the two channels on a dual channel memory module such as that of FIG. 1.

These examples illustrate how error management on a memory module can be changed on the fly, including use of spare memory parts, changing the function of memory parts, and rebuilding lost data using error management algorithms and a memory controller. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

I claim:

1. A memory module, comprising:
    a plurality of storage bits for each memory location;
    a plurality of error management storage bits for each memory location; and
    a memory controller operable to change error management modes on the memory module, thereby changing use of the plurality of error management storage bits associated with each plurality of storage bits for each memory location.

2. The memory module of claim 1, wherein the module comprises a printed circuit board having one or more integrated circuits attached.

3. The memory module of claim 1, wherein the plurality of storage bits and error management bits for each memory location are stored across multiple memory integrated circuits.

4. The memory module of claim 1, wherein changing error management modes comprises using an error management mode providing the greatest error management capability from among the error management modes supported for the number of operable memory components available within the memory module.

5. The memory module of claim 1, wherein the error management mode change is performed while the memory module is in operation.

6. The memory module of claim 1, wherein the error management modes comprise at least one of single error correction double error detection (SECDED), and single chip error correction double chip error detection (SCEC).

7. The memory module of claim 6, wherein the memory module operates in SCEC mode when a sufficient number of memory components are available, and operates in SECDED mode when a lesser number of memory components are available within the memory module.

8. The memory module of claim 7, wherein lesser numbers of memory components are available within the memory module through at least one of memory component failure, manufacturing, or electronic configuration.

9. A method of operating a memory, comprising:
    changing error management modes on a memory module, where the memory module comprises a plurality of storage bits for each memory location and a plurality of error management storage bits for each memory location, wherein changing error management modes comprises changing use of the plurality of error management storage bits.

10. The method of operating a memory of claim 9, wherein the module comprises a printed circuit board having one or more integrated circuits attached.

11. The method of operating a memory of claim 9, wherein the plurality of storage bits and error management bits for each memory location are stored across multiple memory integrated circuits.

12. The method of operating a memory of claim 9, wherein changing error management modes further comprises using an error management mode providing the greatest error management capability for the number of operable memory components available within the memory module.

13. The method of operating a memory of claim 9, wherein the error management mode change is performed while the memory module is in operation.

14. The method of operating a memory of claim 9, wherein the error management modes comprise at least one of single error correction double error detection (SECDED), and single chip error correction double chip error detection (SCEC).

15. The method of operating a memory of claim 14, wherein the memory module operates in SCEC mode when a sufficient number of memory components are available, and operates in SECDED mode when a lesser number of memory components are available within the memory module.

16. The method of operating a memory of claim 15, wherein lesser numbers of memory components are available within the memory module through at least one of memory component failure, manufacturing, or electronic configuration.

17. A memory controller comprising a part of a memory module and operable to change error management modes on the memory module, where the memory module comprises a plurality of storage bits for each memory location and a plurality of error management storage bits for each memory location, wherein changing error management modes comprises changing use of the plurality of error management storage bits.

18. The memory controller of claim 17, wherein the memory module comprises a printed circuit board having one or more integrated circuits attached.

19. The memory controller of claim 17, wherein the plurality of storage bits and error management bits for each memory location are stored across multiple memory integrated circuits on the memory module.

20. The memory controller of claim 17, wherein changing error management modes further comprises using an error management mode providing the greatest error management capability for the number of operable memory components available within the memory module.

21. The memory controller of claim 17, wherein the error management mode change is performed while the memory module is in operation.

22. The memory controller of claim 17, wherein the error management modes comprise at least one of single error correction double error detection (SECDED), and single chip error correction double chip error detection (SCEC).

23. The memory controller of claim 22, wherein the memory controller operates in SCEC mode when a sufficient number of memory components are available, and operates in SECDED mode when a lesser number of memory components are available within the memory module.

24. The memory controller of claim 23, wherein lesser numbers of memory components are available within the memory module through at least one of memory component failure, manufacturing, or electronic configuration.

25. A memory system, comprising:
- at least one memory device comprising a plurality of storage bits for each memory location and a plurality of error management storage bits for each memory location; and
- a memory controller operable to change error management modes for at least one of the memory locations, wherein changing error management modes comprises changing use of the plurality of error management storage bits associated with the at least one memory locations.

26. The memory system of claim 25, wherein the memory system comprises a printed circuit board having one or more integrated circuits attached.

27. The memory system of claim 25, wherein the plurality of storage bits and error management bits for each memory location are stored across multiple memory integrated circuits.

28. The memory system of claim 25, wherein changing error management modes further comprises using an error management mode providing the greatest error management capability for the number of operable memory components available within the memory module.

29. The memory system of claim 25, wherein the error management mode change is performed while the memory module is in operation.

30. The memory system of claim 25, wherein the error management modes comprise at least one of single error correction double error detection (SECDED), and single chip error correction double chip error detection (SCEC).

31. The memory system of claim 30, wherein the memory controller operates in SCEC mode when a sufficient number of memory components are available, and operates in SECDED mode when a lesser number of memory components are available within the memory module.

32. The memory system of claim 31, wherein lesser numbers of memory components are available within the memory module through at least one of memory module failure, manufacturing, or electronic configuration.

* * * * *

UNITED STATES PATENT AND TRADEMARK OFFICE
CERTIFICATE OF CORRECTION

PATENT NO. : 7,292,950 B1
APPLICATION NO. : 11/382178
DATED : November 6, 2007
INVENTOR(S) : Resnick It is certified that error appears in the above-identified patent and that said Letters Patent is hereby corrected as shown below:

In column 2, line 5, after "memory" delete "," and insert -- . --, therefor.

In column 3, line 64, after "correction" delete "1".

Signed and Sealed this

Twenty-fourth Day of June, 2008

JON W. DUDAS
*Director of the United States Patent and Trademark Office*